(12) United States Patent
Stevens

(10) Patent No.: US 7,949,254 B1
(45) Date of Patent: May 24, 2011

(54) SECURITY MESSAGE FILTERING USING OCDMA ENCODING

(75) Inventor: Rick C. Stevens, Apple Valley, MN (US)

(73) Assignee: Lockheed Martin Corporation, Eagan, MN (US)

( * ) Notice: Subject to any disclaimer, the term of this patent is extended or adjusted under 35 U.S.C. 154(b) by 705 days.

(21) Appl. No.: 11/965,390

(22) Filed: Dec. 27, 2007

(51) Int. Cl.
*H04B 10/00* (2006.01)
*H04J 14/00* (2006.01)

(52) U.S. Cl. .......................................... 398/40; 398/77

(58) Field of Classification Search .................. 398/33, 398/77, 40, 78, 140, 151, 165, 166
See application file for complete search history.

(56) References Cited

U.S. PATENT DOCUMENTS

| | | | |
|---|---|---|---|
| 5,608,723 A | 3/1997 | Felsenstein | |
| 6,025,944 A | 2/2000 | Mendez et al. | |
| 6,628,864 B2 | 9/2003 | Richardson et al. | |
| 6,694,431 B1 | 2/2004 | Binding et al. | |
| 6,832,314 B1 | 12/2004 | Irvin | |
| 7,324,755 B2 * | 1/2008 | Izadpanah | 398/78 |
| 2001/0038695 A1 | 11/2001 | Kim | |
| 2003/0180050 A1 | 9/2003 | Pfeiffer | |
| 2004/0037500 A1 | 2/2004 | Yoo | |
| 2004/0208233 A1 * | 10/2004 | Dafesh | 375/147 |
| 2004/0218609 A1 | 11/2004 | Foster et al. | |
| 2005/0100338 A1 | 5/2005 | Yeon et al. | |
| 2005/0149622 A1 | 7/2005 | Kirkland et al. | |
| 2005/0210244 A1 | 9/2005 | Stevens et al. | |
| 2005/0268092 A1 | 12/2005 | Shankar et al. | |

OTHER PUBLICATIONS

Huang, Yue-Kai et al. (Apr. 2005), "Integrated Holographic Encoder for Wavelength-Hopping/Time-Spreading Optical CDMA," *IEEE Photonics Technology Letters*, vol. 17, No. 4.

* cited by examiner

*Primary Examiner* — Dalzid Singh
(74) *Attorney, Agent, or Firm* — Larkin Hoffman Daly & Lindgren Ltd; Craig J. Lervick

(57) ABSTRACT

To achieve secure optical communications, a messaging encoding scheme is utilized in which optical communication signals are encoded based upon a known unique code. This encoding methodology allows for the broad transmission across an optical network which will include intended destination. Only the intended destination or destinations will include the necessary unique codes to allow recognition and decoding of the optically encoded message. By providing security in this optical encoding manner, the need for additional message overhead and/or additional systems is thus avoided, thereby providing efficient communication in a secure manner.

17 Claims, 5 Drawing Sheets

SECURITY MESSAGE FILTERING USING OCDMA ENCODING

BACKGROUND OF THE INVENTION

The present invention relates to messaging techniques within an optical communication network. More specifically, the present invention provides a secure communication approach in an optical network environment which reduces overhead operations and avoids the necessity for additional equipment.

Communication systems have become an important portion of todays electronic society. Generally speaking, these networks and systems provide the ability for vast amounts of information to be communicated as desired and/or necessary. As is well known, examples of these communication systems include the internet, Ethernet systems, networks within contained systems (i.e. automobiles, aircraft, etc.), home networks, and wireless networks. Further, cellular telephone, WiFi, SatCom, IEEE 802.11, etc. systems are also considered to be other types of a communication network.

In each of the above listed examples, a necessity or desire exists to communicate information from one component to another in a specified manner. In certain instances this communication may be more widespread, including transmission to multiple receivers. When transmitting to multiple receivers, the process is often straightforward as "receiver considerations" are not necessary. Stated alternatively, these transmissions can simply be broadcast and allowed to be picked up by any receiver desiring to acquire the particular signal. As an example, broadcasts over on-air systems to multiple receivers is considered to be one such system.

More challenging however, is the communication from one specific source to a single desired receiver. This will often include communication amongst components in a network (e.g. a processor to a printer in an office network). Further, if security is required the challenge of such communication is increased.

To achieve organized communication across virtually any network, protocols and standards are essential. Stated alternatively, some common understanding regarding the way information is transmitted, and the format in which it will be received, is required for these systems to be operational. Many variations may exist depending on the particular circumstances involved. For example, an open network may be involved such as the internet in which information can be widely broadcast and user access is very widespread. The generation of a website accessible on the internet is one example of this communication scheme. Alternatively, closed networks may be involved where only dedicated equipment is connected to the network, thus limiting communication accordingly. One example of this type of configuration is a small office Ethernet that allows communication amongst various computers. Obviously, in a closed environment communication protocols and standards can be much more easily controlled due to the limited access provided. Additionally, the type of information being transmitted may impact the protocol utilized.

Fiber optic communication is widely utilized in various systems due to the well known advantages of optical communication. That said, optical communication networks and systems are continuously evolving as the technology becomes more and more advanced. The further development of optical components allows for new applications and options involving optical signals. System designers simply have more tools at their disposal, thus giving them more options.

As mentioned above, communication amongst components and different systems has become an integral part of society. One of the most basic issues dealt with in communication relates to the addressing and routing of messages or information to achieve smooth communication flow. Another issue relates to the security and controlled access to the communicated messages. Those skilled in the art of network communication are typically familiar with packet type communication in which messages are generated in a "packet" format which can then be routed to appropriate locations. This packet communication methodology is utilized in many areas including the Internet and various voice communication systems.

Security has become an inherent concern in the communications field for some time. As a starting point, it is desirable to ensure that messages are appropriately transmitted and received by the various components within a system. The next level of security relates to controlled access and the avoidance of messages being intercepted or accessed by undesired recipients. To achieve a desired level of security, various measures have been historically utilized, including encryption, limited network access, and addressing security. One previously utilized method of addressing security involves the incorporation of a security kernel into each source and destination within the system. This security kernel methodology incorporates hardware and software components to achieve desired security levels. In essence, this security methodology utilizes look-up tables at both the source and destination which are consulted to ensure access is appropriate. Stated alternatively, each message contains a source and destination indicator, and the security kernel within each node verifies the approved source and destination combination. Utilizing a look-up table at the message source, the intended recipient is verified to ensure delivery is appropriate. Similarly, a recipient will have access to a virtually identical look-up table. When a message is received, this look-up table is consulted in ensure that the recipient rightfully has access to the received message. Once this verification takes place, access to the message itself is verified thereby allowing message communication to be further carried out.

As generally described above, prior art secure communication systems have utilized a security kernel to provide secure communications. One exemplary system carrying out this security methodology is illustrated in FIG. 1. This exemplary system illustrates a pair of nodes within a system—one transmitting node 20 and one receiving node 50. For purposes of simplicity, receiving node 50 and transmitting node 20 have been simplified by omitting additional components. For example, any components that may exist within either node to allow dual purpose operation (transmit and receive) has been omitted. Naturally, the receiving portion of communication nodes simply mirrors the transmission portion, and vise-versa.

Referring now specifically to FIG. 1, message transmit node 20 is illustrated which includes a source system 22, a security kernel 24, a transmitter 26 and a look up table 28. As will be appreciated, source 22 will generate the desired message. In this communication scheme, the message is generated in a packet form, which is also illustrated in FIG. 1. More specifically a message packet 30 includes fields denoting an identification of a source 32, a destination 34, a message label 36 and data 38. In operation, message packet 30 is first passed from source system 22 to security kernel 24, which performs the first step of providing necessary security. Security kernel 24 will read the source indicator 32, destination indicator 34 and label 36 so this information can be compared with data stored in look up table 28. Specifically, look up table 28 contains a listing of the approved message communication combinations allowed within the particular system. For example, look up table 28 may contain an indication that a particular source and destination are allowed to communicate only information having a predetermined label. Further, the label may designate the related data as confidential, secret, top secret, or unprotected. In this case, look up table 28 will contain a listing of communication source and destination pairs that are approved for certain levels of information. Using this information, only certain destinations and sources may be approved for top secret information (for example). Security kernel 24 is then capable of providing a first security check before information is transmitted to insure the appropriateness of messages being transmitted. If approved by security kernel 24, message packet 30 is then transferred to transmitter 26 for transmission across network 40.

As further illustrated in FIG. 1, and as will be appreciated by those skilled in the art, the receiving process of nodes connected to network 40 involves the use of a receiver 52, and a security kernel 54 existing at receiving node 50. At this point, receiving security kernel 54 will perform the same security check outlined above, using a look up table 56 which is virtually identical to look up table 28 discussed above. At this point, receiving node 50 security kernel 54 will approve or deny transmission of the message packet 30 to a destination system 58.

Again, utilizing the system described above, certain complications and problems exist utilizing the security kernel approach. Most significantly, this operation requires processing overhead and time during the communication process. Additionally, messages transmitted to a destination node, must first be stored in local memory for comparison by the relevant look up table. If messages are not approved, or not intended for that particular destination, additional steps must be taken to ensure their deletion from local memory. Again, this provides additional overhead and processing. Verification of security kernels will obviously take some amount of time, thus affecting the speed and throughput of message communications. While this may appear to be negligible at first, when higher volumes are transmitted, any additional steps can slow communication. Naturally, this is an undesirable situation. Further, the security kernel 24 exists as an electrical operation, typically before conversion to optical communication signals by transmitter 26. It would be beneficial to provide communication security while still in the optical domain, thus taking advantages of speed and low losses typically involved without the co-communication.

One additional methodology utilized to approach security from a different perspective includes the use of encoding or encrypting of messages. As recognized by those skilled in the art, many different encryption schemes exist. Generally speaking, these encryption schemes apply some scrambling techniques to the actual data, in a controlled and relatively straightforward manner. However, the scrambling technique is only known to the transmitter and receiver, thus allowing access to communication while limiting access by others. Encoding involves a somewhat similar technique, however often directed towards transmission concerns as opposed to security concerns. Again, encoding involves the scrambling of information which can then only be descrambled by those knowing the encoding technique. One well known encoding methodology involves code division multiple access (CDMA) which is widely utilized in voice communication technologies. For example, cell phone communications widely utilize this CDMA technology. Other encoding methods are used for putting parallel digital information into a serial form. Examples include 8B/10B, 4B/5B, Manchester, PPSK, etc.

While various technologies exist for both implementation of optical communications across networks and security measures, further shortcomings still exist. Again, optical communication networks are evolving and continuously improving, however do not operate as flexibly and efficiently as current electrical communication networks. Similarly, the use of encoding methodologies in optical networks is not yet fully developed. As such, it is desirable to develop a communication technique for use in optical networks which ensures both efficiency and security concerns. Other optical encoding methods are SCM, TDM, OFDM, TDMA, etc. Those could be used for some level of encryption or address keying.

SUMMARY OF THE INVENTION

The present invention provides a more robust and effective communication process which also ensures increased security. Further, the system and method of the present invention allows for the effective control of message communications to ensure operability on an optical communication network and address necessary security concerns. The system and method of the present invention also eliminates the use of a security kernel, thus removing related overhead and operational hurdles related thereto.

As suggested above, the system and method of the present invention is specifically tailored to optical communication networks and secure communication within those networks using existing components. The system and method utilizes optical code division multiple access (OCDMA) to associate a unique code sequence with each message transmitted or group of messages. Based upon this unique code sequence utilized for the message encoding, only the target destination will be capable of decoding the transmitted message. Utilizing this methodology, secure communication is achieved while avoiding the use of security kernels and related overhead as discussed above.

The steps involved for the above referenced optical communication first require the generation of message packets, as is commonly carried out in standard network communication. Next, each packet is encoded using a unique code sequence based upon pre-defined security policies for the network. Once encoded, the packet can be transmitted across the network. Because of the unique encoding methodology utilized, only the particular nodes on the network for which the message is intended will receive the communication. The receiving destinations will also have access to the aforementioned unique code, thus providing the ability to decode the message utilizing the same encoding scheme utilized to generate or transmit the message. Without this unique code, others on the network will not recognize the packet as a message and will not be able to decipher the message transmitted. Consequently, security is achieved without the added overhead of security kernels, encryption codes, etc.

Utilizing the above outlined methodology, the present invention achieves secure communication in an efficient and effective manner. Additionally, the communication security scheme is implemented using optical components and optical signals, thus providing the advantages of optical communication. Further, efficiency is improved by eliminating the need for a security kernel thus avoiding additional system and process overhead.

BRIEF DESCRIPTION OF THE DRAWINGS

Further objects and advantages of the present invention can be seen from reading the following detailed description in conjunction with the drawings in which.

DETAILED DESCRIPTION OF THE INVENTION

As referenced above, the present invention achieves secure communication through the use of a unique optical encoding scheme and addressing methodology, which provides both security and efficient communication in an optical network. The method is carried out using optical components, thus allowing all steps to take place in an optical domain.

Figure 1:
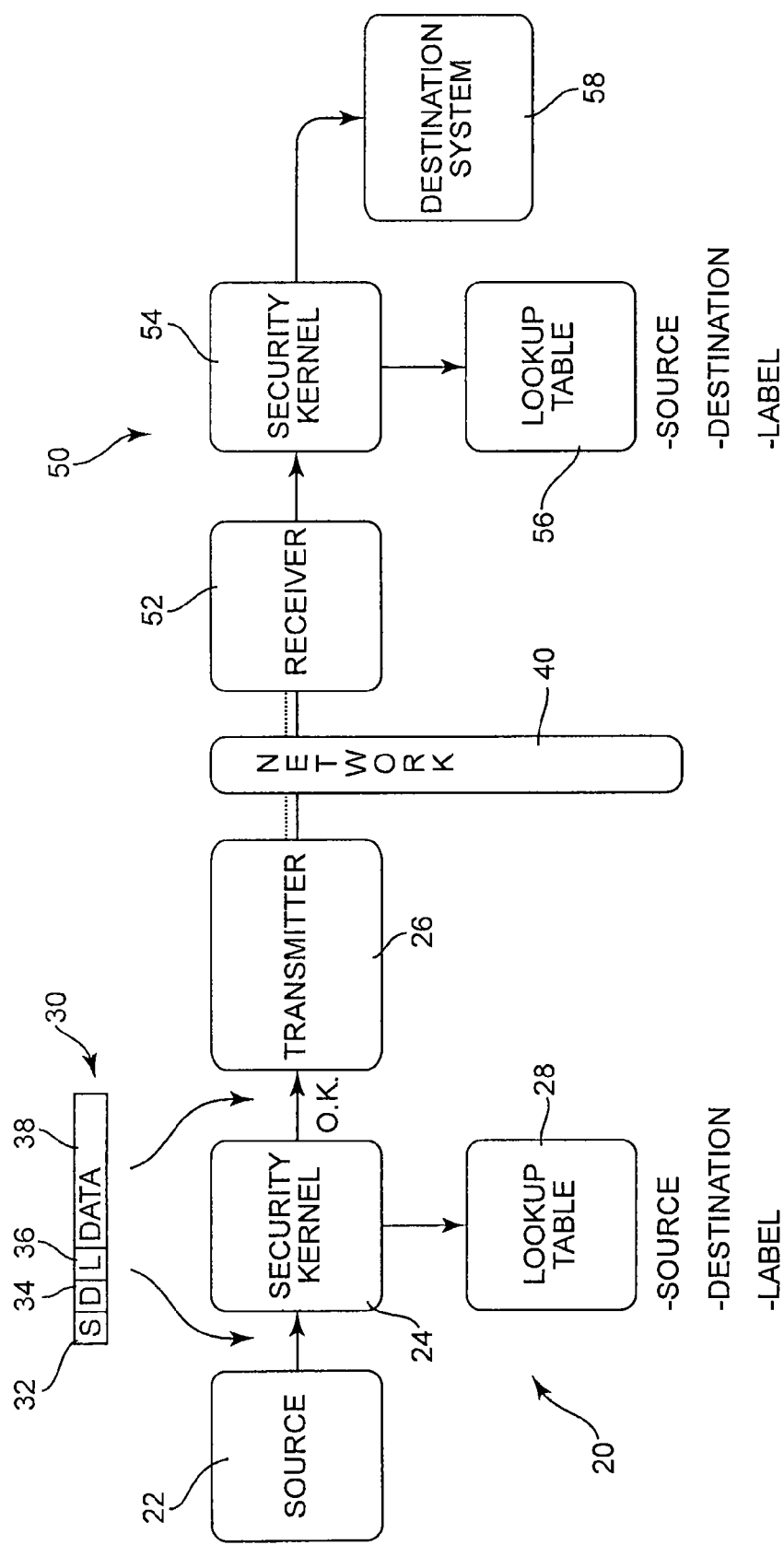
FIG. 1 is a schematic illustration of an exemplary prior art communication system utilizing a security kernel.
Figure 2:
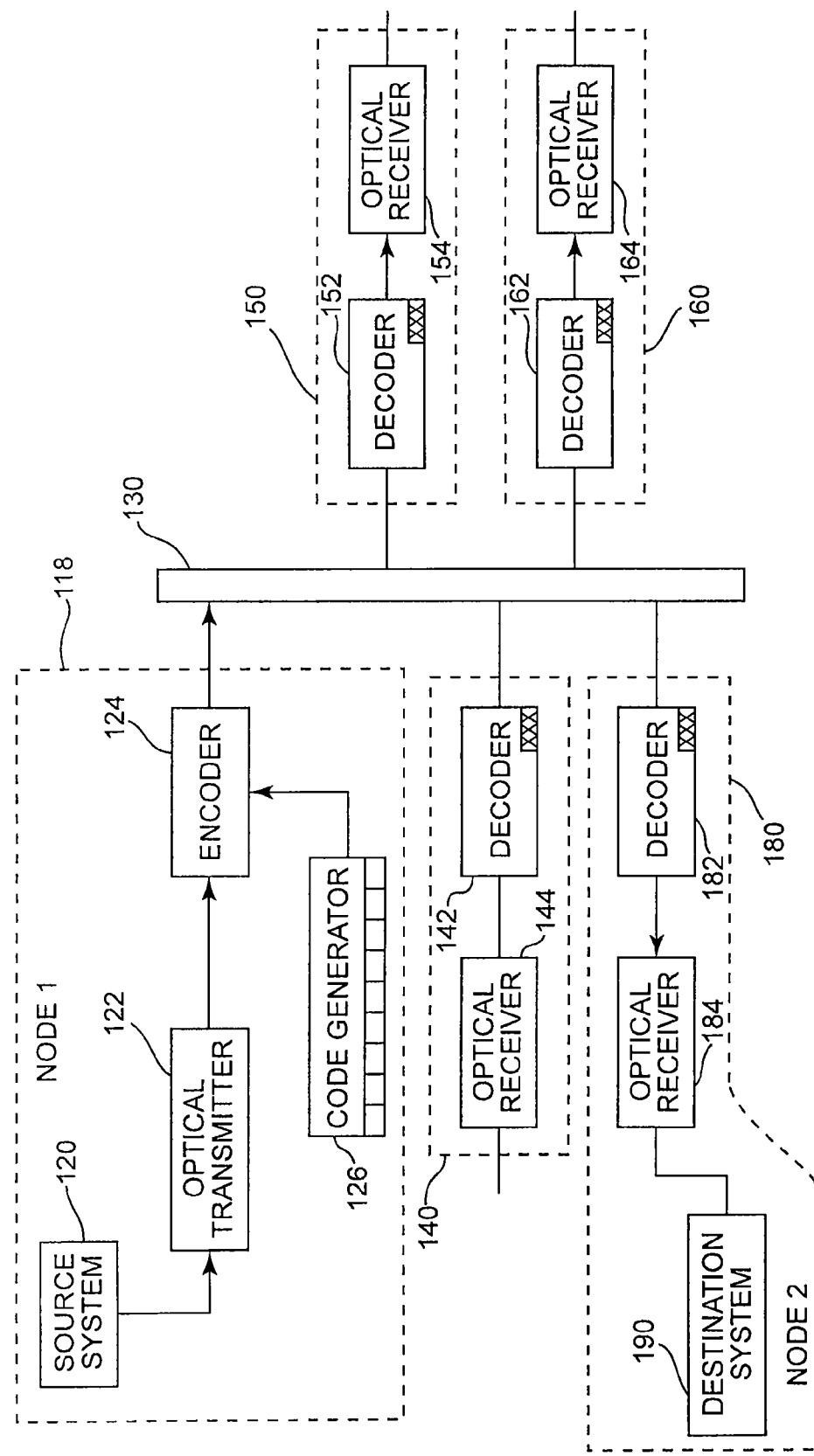
FIG. 2 is a schematic illustration of the communication system of the present invention.

Referring now to FIG. 2, an optical communication system 110 is illustrated which carries out the transmission and communication methodologies of the present invention. As will be further discussed below, this illustrates the basic operating components of such a communication system. It is contemplated that the system will be one part of a larger network, thus only selected components are shown for ease of illustration.

The overall communication system of the present invention will include at least one transmission system or transmission node 118, having at least one source system 120. Further, the communication system will also include at least one destination system 190. In the example illustrated in FIG. 2, a methodology and communication system is utilized to communicate messages between source system 120 within transmission node 118, and destination system 190 within a destination node 180. As can be anticipated, source system 120 will generate the content for a message to be delivered, and provide this content to an optical transmitter 122. As well known by those familiar with optical components, optical transmitter 122 will simply convert the necessary signals from electrical to optical signals. At this point, the optical signals are transmitted to an encoder 124. Encoder 124 also has an input from a code generator 126. Code generator 126 controls the security and encoding processes of the present invention to ensure that the transmitted messages are only readable by designated destinations. In order to achieve this security, code generator 126 provides unique codes for each destination or set of destinations of the communication network which are intended to receive the particular message. Using this unique code, encoder 124 is capable of encoding the message prior to transmission. Once encoded, the message is transmitted to an optical backbone 130 for distribution across an entire network.

As illustrated in FIG. 2, a plurality of nodes 118, 140, 150, 160, 180 are all connected to optical backbone 130. Each receiving node will include a decoder 142, 152 and 162, along with an optical receiver 144, 154, 164 and 184. As can be appreciated, each decoder includes a unique code capable of recognizing messages transmitted across the optical backbone which are intended for that node. As will be more fully explained below, if the messages are not encoded utilizing the same unique code, the various decoders are unable to recognize the message itself, thus providing an initial level of security for the network.

As mentioned above, communication system 110 includes a destination system 190 which, in this particular example, is the targeted destination for the relevant encoded messages. Destination system 190 is part of a destination node 180 which includes a decoder 182 and an optical receiver 184. In this particular case, decoder 182 includes the same unique code that was utilized by encoder 124 to encode the particular message in question. Consequently, decoder 182 will first recognize that a message exists on the optical backbone 130 and be able to appropriately decode the particular message. Once decoded, the message is transmitted to optical receiver 184 and thus communicated to destination system 190. Utilizing this communication scheme, encoded messages are transmitted across the network in a manner to avoid interception by undesired destination nodes. Consequently, secure communication is achieved in an efficient manner.

While the above example illustrates the transmission of a single message from a source system 120 to a destination system 190, it will be recognized by those skilled in the art that multiple nodes can be included as part of the optical communication system outlined above and multiple messages can simultaneously be transmitted on backbone 130. Using these multiple messages, network communication traffic can be achieved linking numerous components to one another while also providing selective security to ensure delivery to only a prescribed node.

Figure 3:
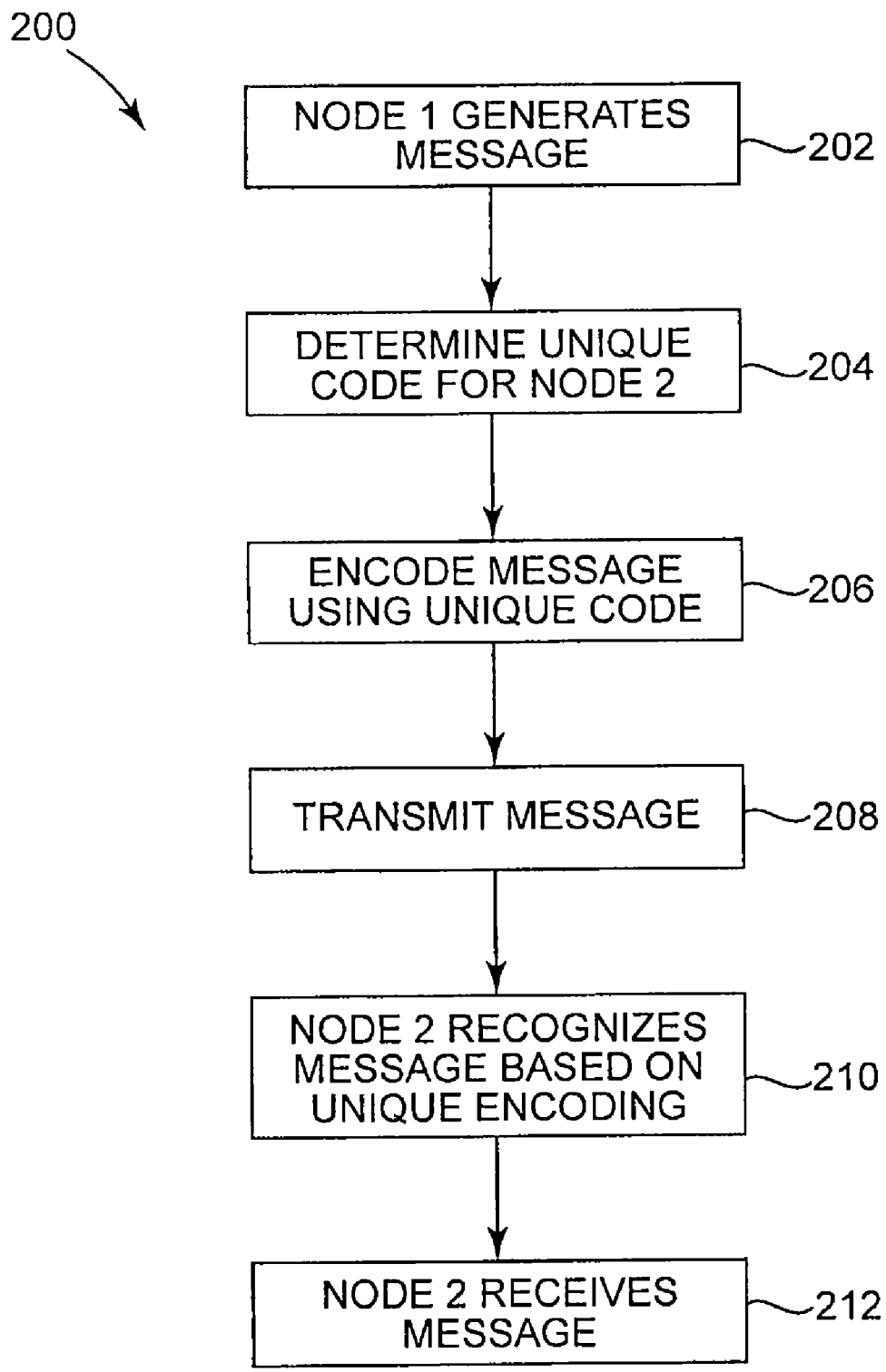
FIG. 3 is a flow chart generally illustrating the communication methodology utilized.

Referring now to FIG. 3 there is a general flow chart illustrating the top level steps outlined above. As indicated, process 200 starts with node 1 generating a message at step 202. Next, an appropriate unique code is determined for the message. Determining the code in this manner will ensure the same unique code is utilized by both the transmitter and receiver. This is carried out in step 204 of FIG. 2. Following the determination of this unique code, the message is then appropriately encoded utilizing the unique code at step 206. Once encoded the message is transmitted at step 208. Once transmitted across the network, node 2 will recognize the message at step 210, based upon the unique encoding of the message. Lastly, at step 212 node 2 will thus receive the message and take appropriate action as necessary.

It is generally anticipated that the systems and process outlined above will be utilized in optical communication systems. One exemplary method for coding is optical code division multiple access encoding (OCDMA). Naturally, other encoding techniques could be utilized. However, utilizing OCDMA allows for broadband transmission of messages across a network while also providing the above discussed measures.

Figure 4:
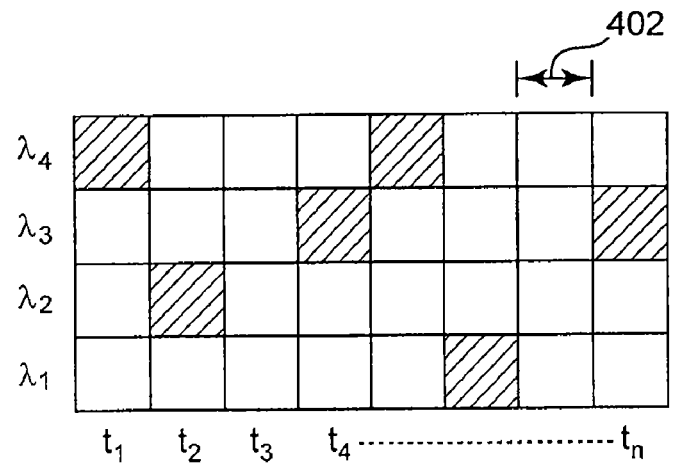
FIG. 4 is a graphical timing diagram for one bit of optically coded information.

Referring now to FIG. 4, there is shown a graphical illustration of OCDMA coding methodologies. Specifically, FIG. 4 illustrates one bit of information which has been encoded using optical signals of four different wavelengths. In this particular example, each cell of the illustrated grid represents a chip 402. In this particular case, four different wavelengths have been chosen, and are illustrated as $\lambda_1$, $\lambda_2$, $\lambda_3$ and $\lambda_4$ on the vertical axis of the grid. Further, time slices are illustrated, with each designated as $t_1$, $t_2$, $t_3$, $t_4$, to $t_n$. For this particular encoding scheme, the shaded boxes illustrate those wavelengths and time periods which would be designated as containing meaningful information. Encoders of the present invention will contain the necessary information to encode relevant information at the designated wavelengths and time periods. Consequently, any receiver which does not have a corresponding decoder, will not be able to decipher meaningful information from the encoded signal. As can be anticipated, multiple wavelengths and multiple time periods are potentially usable, thus providing for many code variations in the encoding scheme. These code variations can provide strong code separation necessary for secure applications.

Figure 5:
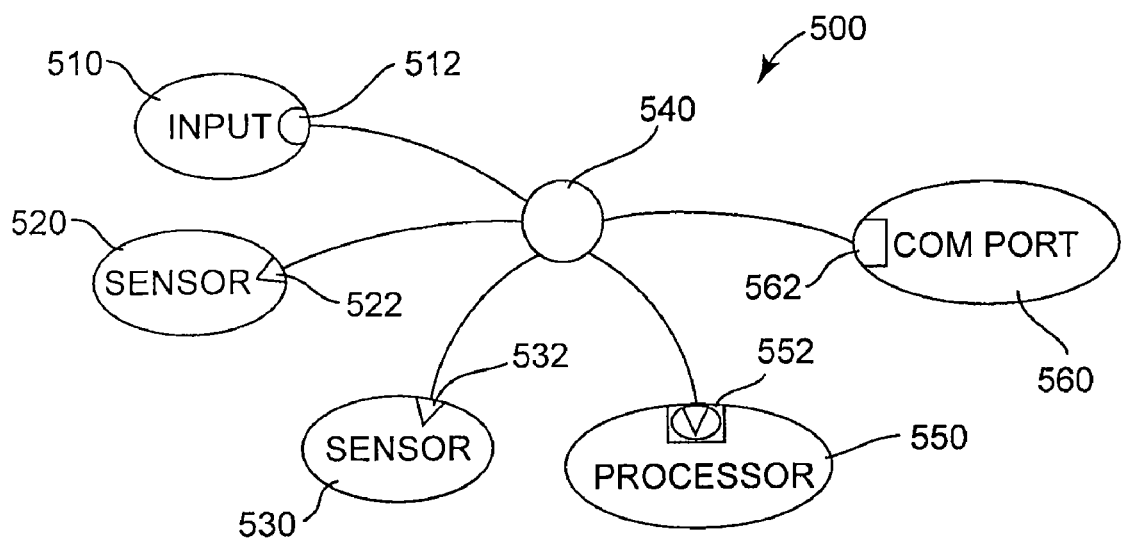
FIG. 5 is a system diagram illustrating one exemplary system utilizing the security methodology of the present invention.

FIG. 5 is a system diagram illustrating one potential application of the present invention. In a closed optical network environment 500, several devices are connected to a network 540 via appropriate connections. This example shows an input device 510, a first sensor device 520, a second sensor device 530, a processor 550 and a communication port 560 all connected to network 540. Utilizing the OCDMA example discussed above, each of these nodes will include appropriated filters to incorporate an appropriate coding methodology. As illustrated, input device 510 includes an input/output filter 512 at its interface. Similarly, first sensor device 520 includes interface filter 522. Second sensor device 530 includes an interface filter 532, communication port 560 includes an interface filter 562 and lastly, processor 550 includes an interface filter 552. In this particular illustration, the relevant interface filters have been drawn in slightly different configurations to signify differences there between. Specifically, these differences are simply designed to affect different coding using various codes. Each of these codes is similar to that illustrated in FIG. 4 above. For example, first sensor filter 522 and second sensor filter 532 are configured to be substantially identical. More significantly, each incorporates the same code. Processor 550 includes an interface having multiple filters, thus capable of communicating using several codes. In this particular system, first sensor 520 and second sensor 530 are intended to communicate with processor 550. Similarly, input device 510 is configured to communicate only with processor 550. Likewise, communication port 560 is designed to potentially allow communication only with processor 550. Thus, because different coding is used in the encoder/decoder incorporated in each device (i.e. node) this controlled and secure communication is achieved.

As an example of the unique coding suggested above, messages are easily passed from input device 510 to processor 550 over the network 540. That said, first sensor 520 and second sensor 530 will not recognize messages intended for communication only between processor 550 and input device 510. Similarly, messages communicated between processor 550 and Com. port 560 will utilize another unique code, thus accommodating the passages of messages while also providing security. As other components attached to network 540 do not have the necessary codes, they again will not recognize information being transmitted.

Figure 6:
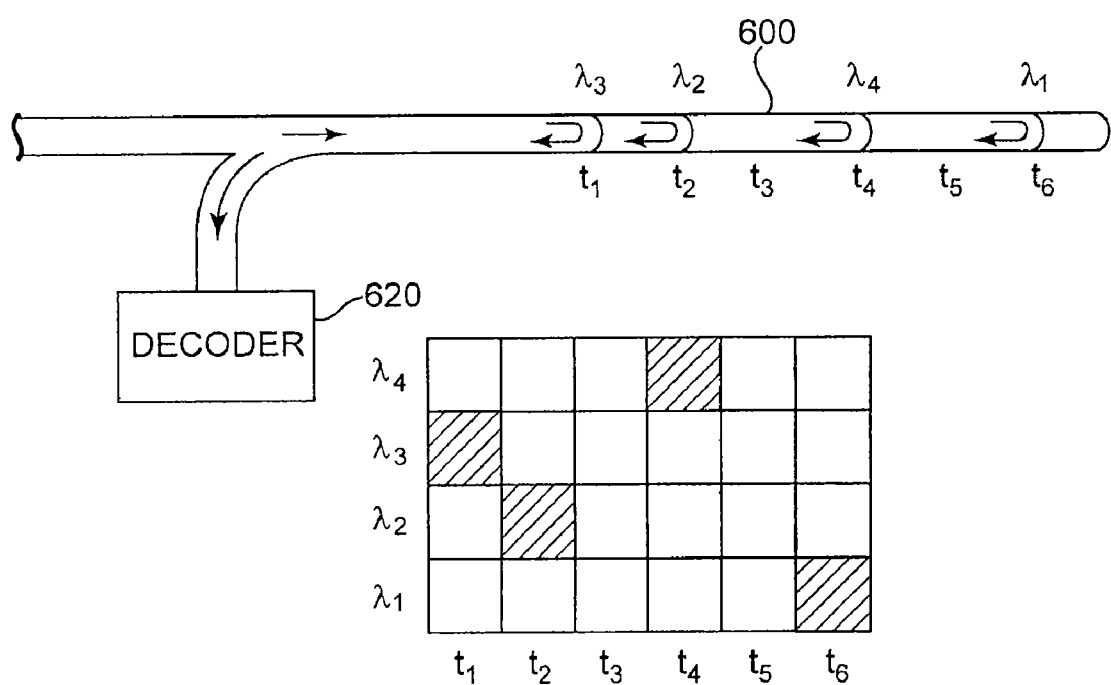
FIG. 6 is an illustration of one potential filter for use in the system of the present invention.

Various methodologies may be used for the implementation of filters or encoders/decoders. FIG. 6 illustrates one potential filter for use in the present systems. In this particular device, a fiber 600 is specifically treated to have various reflection points reactive to selected wavelengths. The reflection points are positioned at specified locations in order to achieve a prescribed timing, as illustrated in the related timing diagram. Consequently, spread spectrum signals received by this component will have selected frequencies reflected at specific points in time, causing those particular components to be separated and recognized. The reflected signals can be fed to a decoder 620 which is then capable of recognizing the data provided, and performing further processing. This is simply one example, and other examples may exist for relevant filters.

While the system and method outlined above provide one mechanism for achieving encoded optical communications, those skilled in the art recognize that many variations and alternatives may exist. These alternatives and variations include all systems and processes coming within the scope and spirit of the following claims. It is not intended or contemplated that the present invention be limited to only the embodiment discussed and illustrated above.

What is claimed is:

1. A method for communicating secure messages in an optical network environment, comprising:
    generating message content for communication between a source node and a destination node within an optical network;
    converting the message content to an optical communication packet for transmission to the destination node; and
    encoding the optical communication packet for communication across the optical network using a unique code which is known only to the source node and the destination, such that only the destination node will be able to decode the encoded communication packet and others on the optical network will not recognize the encoded packet, wherein the unique code identifies a plurality of particular optical wavelength/time pairs and wherein the optical communication packet is encoded at these particular wavelength/time pairs.

2. The method of claim 1 wherein the communication of a plurality of secure messages are achieved by encoding via spread spectrum encoding at a plurality of selected optical wavelength/time pairs.

3. The method of claim 2 wherein the coding is optical code division multiple access encoding.

4. The method of claim 1 wherein the unique code is an identifier indicating which chips within a spread spectrum bit contain meaningful information.

5. The method of claim 1 wherein the network includes a plurality of nodes and only the destination node will recognize the optical communication packet due to the destination node having the unique code.

6. The method of claim 1 wherein the network includes a plurality of destination nodes, with each destination node having the unique code, thus allowing the plurality of destination nodes to each recognize and receive the optical communication packet.

7. The method of claim 1 further comprising transmitting the optical communication packet to the destination node, wherein the optical communication packet travels on an optical backbone such that only the destination node is able to recognize that the optical communication packet is traveling on the optical backbone due to the destination node having the unique code.

8. The method of claim 1 further comprising decoding the secure messages using the designating particular wavelength/time pairs, wherein the optical communication packet is transmitted to the destination node via a fiber specifically treated to have a plurality of reflection points reactive to selected wavelengths, the plurality of reflective points being positioned at a plurality of specified locations to achieve a prescribed timing, the wavelengths reactive to the plurality of reflection points and prescribed times corresponding to the particular wavelength/time pairs.

9. A method for providing secure communications in an optical network which includes a plurality of nodes, comprising:
    providing each node with at least one encoder capable of encoding messages using pre-established encoding codes, wherein each encoding code comprises at least one wavelength/time pair and is assigned according to an overall network protocol, wherein the network protocol designates approved communication pathways and approved message types for transmission across the approved pathways;
    generating messages to be transmitted;

encoding messages to be transmitted using optical code division multiple access using the unique codes assigned to the encoder such that only those recipients on the optical network which are approved for receipt of the encoded message will be capable of recognizing the encoded message due to position of an identical unique code wherein the unique code identifies a location within a transmission signal that will contain the encoded messages;

transmitting the encoded messages across the optical network; and recognizing and decoding, at the intended nodes on the optical network, the transmitted message due to their possession of the unique code.

10. The method of claim 9 wherein the encoding is achieved using optical code division multiple access encoding.

11. The method of claim 9 wherein the network protocol provides code assignment to achieve a plurality of levels of secure communication.

12. The method of claim 9 wherein each node includes an optical filter to achieve the encoding, wherein the optical filter is capable of carrying out the encoding steps to produce an encoded optical signal.

13. The method of claim 9 wherein the messages are generated and transmitted as a message packet.

14. A secure communication system, comprising:

a first node having a source system for producing a message to be transmitted, an optical transmitter for converting the message to be transmitted into an optical signal, and an optical encoder for encoding the optical signal thus producing an encoded optical message, wherein the optical encoder encodes the message using a unique code previously provided to the encoder based on a pre-established communication protocol, wherein the unique code comprises a set of particular wavelength/time pairs including a plurality of wavelengths and corresponding times, wherein the set of particular wavelength/time pairs identify locations within a transmitted signal which contain meaningful information making up the message;

an optical network for receiving the encoded optical message and transmitting to a plurality of node attached to the network; and a second node having a decoder for decoding the encoded message, the decoder having the unique code thus providing the ability to recognize and decode the encoded optical message, the second node further having a receiver for receiving the decoded optical message and converting the message to an electrical format for transmission to a receiving system.

15. The communication system of claim 14 wherein the encoder is an optical filter operating in conjunction with a controller to achieve optical code division multiple access encoding using the unique codes.

16. The communication system of claim 14 wherein the decoder is an optical filter operating in conjunction with a controller to achieve optical code division multiple access decoding.

17. The communication system of claim 14 wherein the optical network comprises a fiber specifically treated to have a plurality of reflection points reactive to selected wavelengths, the plurality of reflective points being positioned at a plurality of specified locations to achieve a prescribed timing, the wavelengths reactive to the plurality of reflection points and prescribed times corresponding to the particular wavelength/time pairs.

* * * * *